F. W. J. GOERSCH.
AIR DRYING ATTACHMENT FOR CARBURETERS.
APPLICATION FILED MAR. 6, 1913.

1,086,763.

Patented Feb. 10, 1914.

UNITED STATES PATENT OFFICE.

FRIEDRICH W. J. GOERSCH, OF CLEVELAND, OHIO.

AIR-DRYING ATTACHMENT FOR CARBURETERS.

1,086,763.  Specification of Letters Patent.  Patented Feb. 10, 1914.

Application filed March 6, 1913. Serial No. 752,428.

*To all whom it may concern:*

Be it known that I, FRIEDRICH W. J. GOERSCH, a subject of the Emperor of Germany, residing at Cleveland, in the county of Cuyahoga and State of Ohio, have invented certain new and useful Improvements in Air-Drying Attachments for Carbureters, of which the following is a specification.

This invention relates to carbureters, and comprises a device for drying the air which is admitted to said carbureters and mixed with the fuel to form the charge or combustible vapor. In order to insure proper saturation or formation of the combustible vapor it is desirable that the air be free from moisture as much as possible.

I am aware that it has been proposed to heat and dry the air admitted to carbureters. Ordinarily this is done by heating devices. I have provided a mechanical device which I have found will accomplish the result in a satisfactory manner, by causing the condensation of aqueous vapor carried by the incoming air.

The invention is illustrated in the accompanying drawing in which—

Figure 1:
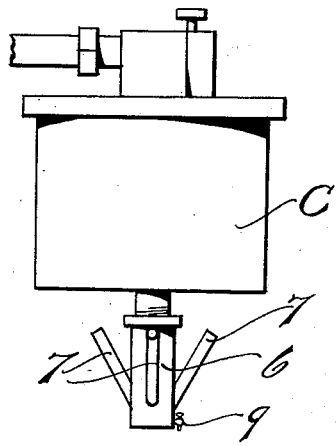
Figure 2:
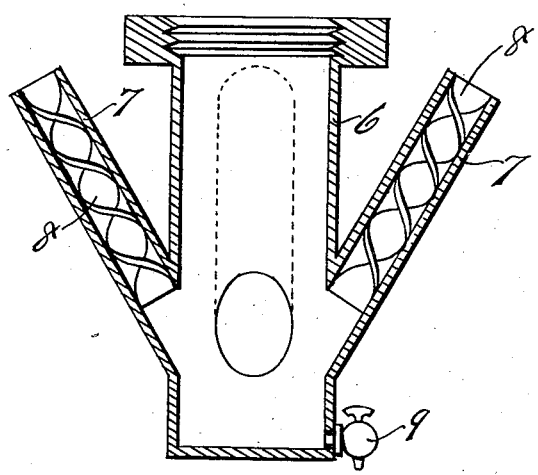

Figure 1 is a side view of a carbureter, provided with the device. Fig. 2 is a vertical section of the device removed from the body of the carbureter.

The carbureter C may be of any suitable type, and in the form illustrated has an inlet for air at the bottom.

The attachment invented by me comprises a pipe 6 which is coupled in any suitable way to the air inlet pipe of the carbureter. The pipe or tube 6 is closed at its lower end, which has a cock 9 to let out water of condensation. A plurality of downwardly inclined tubes 7 are arranged around the central tube and communicate therewith near the lower end thereof, and each of these tubes has therein a spiral blade or partition 8 forming a spiral passage from the inlet at the upper end of each tube 7 to the lower end thereof where it joins the central tube. In consequence of the carbureter suction, air is drawn downwardly through the tubes 7 and is then reversed and passes upwardly through the central tubes 6 to the carbureter, and during this flow the spiral passages cause a whirl and disturbance of currents incident to the changes of direction which I have found results in the condensation of any entrained moisture. The condensation forming on the surface of the spiral blades and the tubes flows down into the pocket at the bottom of the central tube, from which it may be let out through the cock 9 as necessary. The spiral blades 8, by lengthening and decreasing the size of the passage, serve to increase the velocity of flow of air through the tubes 7, and I have found that this acceleration of speed combined with the sudden reversal of direction and disturbance of the air currents when they reach the central tube, assist in precipitating the moisture carried by the air, so that it is delivered to the carbureter in a comparatively dry condition.

I claim:

1. An air drying attachment for carbureters, comprising a tube adapted for connection to the air inlet of the carbureter, said tube having one or more inlet branches communicating with the side thereof at an inclination, to suddenly change the direction of flow of the air.

2. An air drying attachment for carbureters, comprising a tube adapted for connection to the air inlet of the carbureter, said tube having one or more inlet branches communicating with the side thereof at an inclination, to change the direction of flow of the air, said branches having partitions therein forming a tortuous passage in each.

3. An air drying attachment for carbureters, comprising a tube adapted for connection to the air inlet of the carbureter, said tube having one or more inlet branches communicating with the side thereof at an inclination, to change the direction of flow of the air, said branches having spiral partitions and passages therein.

4. An air drying attachment for carbureters, comprising an upright tube open at its upper end for connection thereof with the air inlet of the carbureter, and closed at its lower end, and one or more tubular inlet branches inclined downwardly and opening at their lower ends into the side of the upright tube.

5. An air drying attachment for carbureters, comprising an upright tube open at its upper end for connection thereof with the air inlet of the carbureter, and closed at its lower end, and one or more tubular inlet branches inclined downwardly and connected at their lower ends to the upright tube each of said branches having a partition therein forming a tortuous passage.

In testimony whereof, I do affix my signature in presence of two witnesses.

FRIEDRICH W. J. GOERSCH.

Witnesses:
JOHN A. BOMMHARDT,
STEDMAN J. ROCKWELL.